United States Patent
May

(10) Patent No.: US 8,915,508 B2
(45) Date of Patent: Dec. 23, 2014

(54) HEIGHT SENSOR FOR AN AIR SPRING

(71) Applicant: Lutz May, Berg (DE)

(72) Inventor: Lutz May, Berg (DE)

(73) Assignee: Veyance Technologies, Inc., Fairlawn, OH (US)

( * ) Notice: Subject to any disclaimer, the term of this patent is extended or adjusted under 35 U.S.C. 154(b) by 0 days.

(21) Appl. No.: 14/090,735

(22) Filed: Nov. 26, 2013

(65) Prior Publication Data

US 2014/0145411 A1    May 29, 2014

(30) Foreign Application Priority Data

Nov. 26, 2012  (EP) .................................... 12194294

(51) Int. Cl.
| | |
|---|---|
| *B60G 9/04* | (2006.01) |
| *G01M 17/04* | (2006.01) |
| *B60G 11/26* | (2006.01) |
| *G01S 15/08* | (2006.01) |
| *F16F 9/32* | (2006.01) |
| *F16F 9/05* | (2006.01) |

(52) U.S. Cl.
CPC ............... *G01M 17/04* (2013.01); *B60G 11/26* (2013.01); *G01S 15/08* (2013.01); *F16F 9/3292* (2013.01); *F16F 9/05* (2013.01)
USPC .............. 280/124.157; 267/64.19; 267/64.23; 267/64.27; 324/635; 324/207.15; 324/207.17

(58) Field of Classification Search
USPC ........ 280/124.157; 92/5 R; 267/64.19, 64.23, 267/64.27; 324/635, 207.15, 207.17
See application file for complete search history.

(56) References Cited

U.S. PATENT DOCUMENTS

| | | | | |
|---|---|---|---|---|
| 5,707,045 | A  * | 1/1998 | Easter | 267/64.21 |
| 6,036,179 | A  * | 3/2000 | Rensel | 267/64.11 |
| 7,733,239 | B2 * | 6/2010 | Nordmeyer | 342/125 |
| 7,959,136 | B2 * | 6/2011 | Nordmeyer | 267/64.27 |
| 7,959,137 | B2 * | 6/2011 | Nordmeyer | 267/64.27 |
| 8,614,518 | B2 * | 12/2013 | Li et al. | 290/1 R |
| 8,671,782 | B2 * | 3/2014 | Mink | 73/862.624 |
| 2010/0225527 | A1 * | 9/2010 | Talty et al. | 342/145 |
| 2012/0056616 | A1 * | 3/2012 | May | 324/207.15 |

FOREIGN PATENT DOCUMENTS

| | | | | |
|---|---|---|---|---|
| DE | 10 2006 017 275 A1 | 10/2007 | ....... | B60G 17/01933 |
| DE | EP 1845278 A1 | 10/2007 | ....... | B60G 17/01933 |
| DE | 10 2008 064 647 A1 | 2/2010 | ........... | B60G 17/019 |
| EP | 2366972 A2 | 9/2011 | | |

* cited by examiner

*Primary Examiner* — Toan To
(74) *Attorney, Agent, or Firm* — Alvin T. Rockhill; Kathleen K. Bowers

(57) ABSTRACT

The subject invention relates to an air spring height sensor. The air spring height sensor of this invention comprises a height measuring signal transmitter (102) and a receiver (101). The height measuring signal transmitter is adapted for transmitting a height signal. The receiver is adapted for sensing the height signal transmitted by the height measuring signal transmitter. The height signal indicates a distance between the height measuring signal transmitter and the receiver.

19 Claims, 6 Drawing Sheets

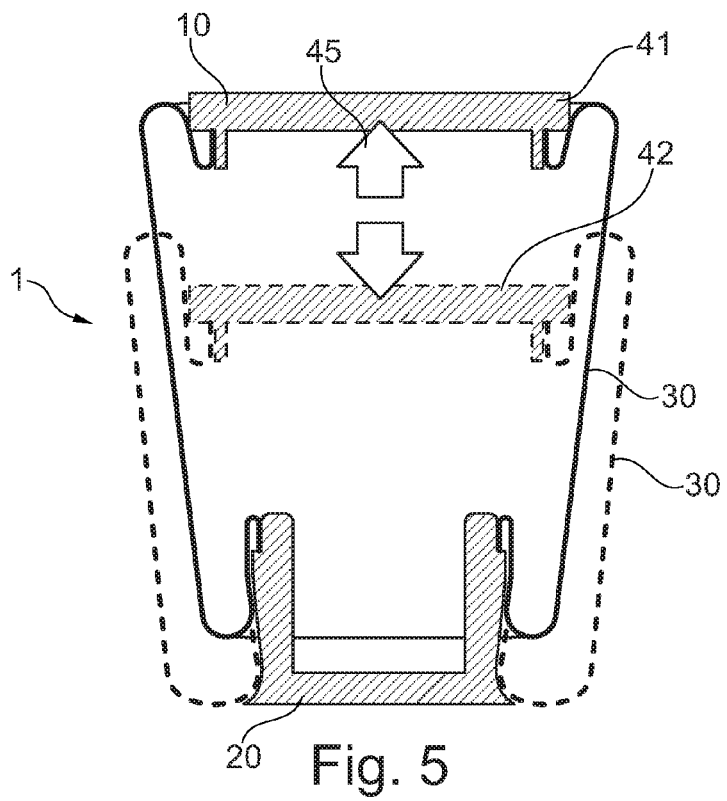
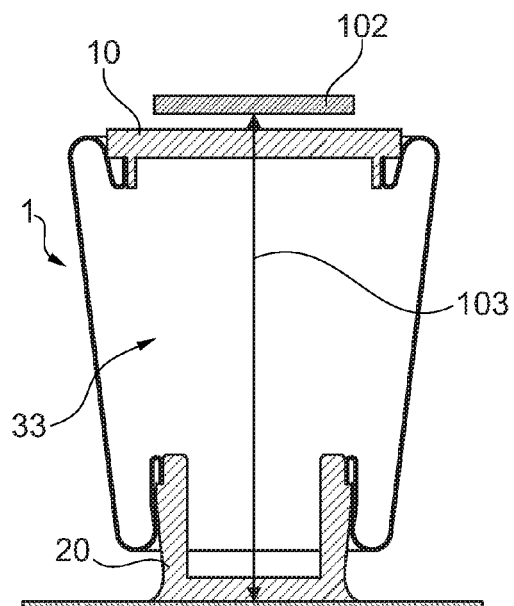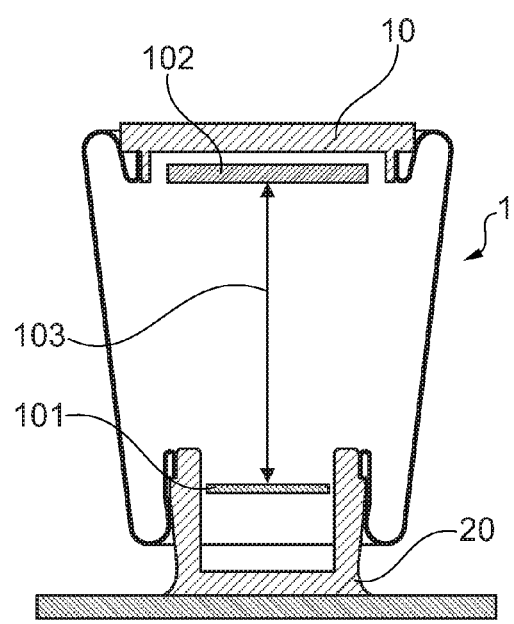

HEIGHT SENSOR FOR AN AIR SPRING

This application claims benefit of European Patent Application Serial No. EP 12194294.0, filed on Nov. 26, 2012. The teachings of European Patent Application EP 12194294.0 are incorporated herein by reference in their entirety.

FIELD OF THE INVENTION

The invention relates to distance measurement and in particular to a distance sensor, an air spring height sensor and an air spring for a vehicle having an air spring height sensor or a distance sensor.

BACKGROUND OF THE INVENTION

Height or distance measurement has a wide variety of possible applications. However, the environment where the height measurement is being made can present a wide variety of challenges. This is particularly the case in situations where height or distance measurements are being made in automotive applications. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

EP 2 366 972 and United States Patent Publication No. 2012/0056616 A1 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

It may be seen as an objective technical problem to provide an air spring height sensor which enables a more reliable transmission of a height signal from a first measuring element in form of a height measuring signal transmitter to a second measuring element in form of a receiver.

According to an aspect of the subject invention, an air spring height sensor is provided which comprises a height measuring signal transmitter and a receiver. The height measuring signal transmitter is adapted for transmitting a height signal and the receiver is adapted for sensing the height signal transmitted by the height measuring signal transmitter. The height signal indicates a distance between the height measuring signal transmitter and the receiver.

The air spring height sensor as described above and hereinafter may in particular be a contactless height sensor which accordingly enables height measurement with reduced or no wear and tear to the measurement components including the height measuring signal transmitter and the receiver.

The air spring height sensor as described above and hereinafter may also be used in general as a distance sensor and is a non-contact, and active measurement solution that can measure the actual height or distances between two locations that are placed opposite to each other. The term "opposite" as used herein in this respect does not necessarily mean that the two locations are parallel or orthogonal to each other and can accordingly be positioned so as to have a lateral offset.

The air spring height sensor of this invention can advantageously be used in pneumatic powered air spring and dampening applications as well as a larger number of additional industrial applications where distances between two objects or locations need to be measured and controlled. These applications may be either actively controlled by using a pneumatic, hydraulic, electric, or otherwise powered actuation system, or these applications need not be actively powered in any respect.

The air spring height sensor system of this invention operates on magnetic principles and may tolerate being used under harsh operating conditions, including severe air pressure changes, changes in humidity, dusty and dirty environments, the presence of mechanical vibrations, and the presence of all kinds of audible noise.

There are numerous combinations possible regarding how to implement a height sensor based upon magnetic principles in air spring as well as other distance measurement applications. In any case, the air spring height sensor of this invention as described above and hereinafter functions on the use of magnetic principles. The air spring height sensor can be placed entirely on one end (single ended module) of an air spring unit (such as at the top or at the bottom of the air spring unit), or the air spring height sensor can be split into two functional parts wherein each part is positioned at an end which is opposite to the other. When using a single ended module air spring height sensor, then the air spring height sensor module can be placed at the far end of the air spring (opposite to where the electric power and the air supply is entering the air spring unit), or it can be placed at the same end where electric power and the air supply enters the air spring application. When using a dual module air spring height sensor solution, then the two modules height measuring signal transmitter and receiver may operate in a wireless mode to each other (no wires are used to connect them) or they can be connected using electric wires.

The air spring height sensor may in particular be place inside of an air spring and can measure short distances (in the range of only a few millimeters, such as 2 mm or 5 mm) to much larger distances, such as 40 cm, 50 cm, or 60 cm. Thus, the air spring height sensor may be protected from external influences including water, oil, other organic fluids, dust and dirt.

The air spring height sensor may be placed anywhere within an interior space of an air spring and does not require a passive or actively controlled valve to be placed in close proximity to it. The air spring height sensor operates independently and provides a height signal that is directly related to the distance between two points, such as the absolute height of the air spring device.

The electric power required to run the air spring height sensor as described above and hereinafter may be provided through wires that connect the sensor unit to the environment outside of the closed structure of the air spring. In any case, the air spring height sensor as described above and hereinafter may help to overcome several properties and characteristics of conventional air spring height measurement systems which may be undesirable: conventional magnetic height sensor solutions may be functional at short distances only (within a few mm or a very few centimeters. The air spring height sensor as described above and hereinafter is very sensitive and can process reliably even very small signals and thus determine small distance changes or changes in small or large distances. Additionally, the air spring height sensor may be insensitive to changing of the air pressure, changing of the air temperature, and changing of the humidity of the air which all three may keep changing rapidly in an air spring system.

The air spring height sensor as described above and hereinafter may be used in applications in the transportation market, passenger cars, commercial vehicles and trucks, rail road for coaching and moving sensitive loads, avionics, industrial applications, consumer market and in high-end sports and training equipment.

The receiver may be an active receiver or a passive reference device adapted for providing a signal suitable for height measurement. Thus, the reference device may be for example a measurement target of a magnetic principle operating height sensor and may be in particular a conductive plate of any conductive material, a ferromagnetic plate with magnetic properties, a passive resonance circuit, preferably a coil and a capacitor, or an active component that has the ability to switch the resonance frequency of the resonator (like using a coil and capacitor, for example) or to modulate the impedance of the resonator.

When using an active reference device, then there may be evaluation and analysis units integrated into an electronic circuit that may have the ability to perform the actual measurement computation and also may manage the data communication protocol between the height measuring signal transmitter and the receiver.

The physical dimensions of the reference device may depend on several factors, but are not limited to the following: sensitivity of the height measurement equipment, i.e. the more sensitive the measurement equipment must be, the smaller the reference device can be. From that point of view there are no limitations in the size of the reference device which may range from very small to very large, i.e. from few millimeters up to tens of centimeters, the quality (or resistivity) of the resonance circuit used, i.e. the lower the resistivity at the resonance point is the higher performing the measurement system will be, distance that has to be covered by the height measurement system, i.e. the larger the distance, the larger the reference device may have to be, thickness of the reference effective material or the resonance element used.

Assuming that the reference device is a metal plated surface of a non-conductive surface, then the thickness of the metal plating may have an impact on the effective resistivity of this layer.

According to an embodiment of the invention, at least one of the height measuring signal transmitter and the receiver is adapted for being connected to an electric power supply. The electric power supply may be a wired power supply which is driven or powered by the electric system of a target object, such as a car or a truck. Accordingly, it may not be necessary to power the air spring height sensor by means of a battery or another removable power source which may be subjected to wear and tear and may require maintenance, change, or replacement. According to a further embodiment of this invention both of the height measuring signal transmitter and the receiver are connected to an electric power supply.

According to still another embodiment of the invention, one energy transmitting element of the height measuring signal transmitter and the receiver is adapted for transmitting energy to the other one energy receiving element of the height measuring signal transmitter and the receiver wireless, wherein the energy transmitting element is adapted to generate a magnetic field and wherein the magnetic field is adapted to induce an electric current in the energy receiving element. Thus, one of the height measuring signal transmitter and the receiver may be operated without any active electric power source as the needed electric power is generated out of a magnetic field generated by the other one of the height measuring signal transmitter and the receiver. In this context, the element which is generating the magnetic field is called the energy transmitting element and the other one is called the energy receiving element. The electric current induced in the energy receiving element is used for powering the energy receiving element. This energy source may be used additionally or alternatively to the wired electric power supply. For example, this power source may be a redundancy system in case the wired electric power supply breaks down, does not provide enough power, or has a break down due to mechanical damages of the wires.

According to a further embodiment of the invention, the air spring height sensor further comprises a first energy transfer element which connects the height measuring signal transmitter to the receiver such that an energy transfer between the height measuring signal transmitter and the receiver is facilitated, wherein the first energy transfer element is adapted for transmitting energy from one of the height measuring signal transmitter and the receiver to the other one of the height measuring signal transmitter and the receiver. The first energy transfer element may be a wire, in particular a copper wire, adapted for transmitting electrical energy. The first energy transfer element may in particular have a high resistance against mechanical stress or load and in particular against bending forces as the energy transfer element may be subjected to bending in case the height measuring signal transmitter and the receiver moves toward each other when operating the air spring height sensor. Thus, the first energy transfer element may be an additional energy providing source to one of the height measuring signal transmitter and the receiver and may represent a further redundancy system.

According to a further embodiment of the invention, the air spring height sensor further comprises a first height signal transfer element adapted for transmitting the height signal from one of the height measuring signal transmitter and the receiver to the other one of the height measuring signal transmitter and the receiver. The first height signal transfer element may transmit the height signal using optical signals, acoustical signals, electrical signals, or any other kind of signals suitable for transmitting data.

The first height signal transfer element enables a transmission of the height signal in particular from the receiver to the height measuring signal transmitter, as the height measuring signal transmitter may initiate the height measuring process and the receiver may be adapted to determine the distance between these elements as a function of a received signal transmitted by the height measuring signal transmitter. The height signal may thus be transmitted from the receiver to the height measuring signal transmitter, wherein the height signal is provided to an evaluation unit which is adapted for further processing the received height signal.

According to a further embodiment of the invention, the height signal is transmitted wirelessly from one of the height measuring signal transmitter and the receiver to the other one of the height measuring signal transmitter and the receiver. The height signal may be transmitted wireless additionally or alternatively to the wire bound transmission of the height signal. In cases where the height signal is transmitted both wireless and wire bound, a signal verification may be done and thus ensured that no transmission failure has happened. In cases where the transmitted height signals contradict each other (are not the same), the according height signal may be discarded or rejected.

According to a further aspect, an air spring is provided which comprises a first mounting element being adapted for being mounted to a first vehicle portion, a second mounting element being adapted for being mounted to a second vehicle portion being springy movable with respect to the first vehicle portion, an air volume limited by a resilient belly having an interior space, a first edge, and a second edge, which belly with the first edge is sealed to the first mounting element and with the second edge is sealed to the second mounting edge, and an air spring height sensor as described above and hereinafter, wherein the air spring height sensor is adapted for measuring a working stroke of the air spring which corresponds to a distance between the first mounting element and the second mounting element.

The air spring height sensor may in particular be suitable for being used in a harsh environment such as in an air spring for a vehicle, wherein the air spring height sensor may be subjected to varying temperatures, dirt, dust, water, oil, and other organic fluids. Due to security reasons, it may be necessary to sample the working stroke of an air spring on a regular basis, for example every second or a few times per second. The air spring height sensor is arranged for reliably providing such height measurement of the air spring.

According to one embodiment of this invention, the height measuring signal transmitter is mounted to the first mounting element and the receiver is mounted to the second mounting element as to sense a height signal with respect to the first mounting element. Both the height measuring signal transmitter and the receiver may be mounted to the first mounting element and to the second mounting element, respectively inside or outside of the belly. The first mounting element and the second mounting element may be designed movable and change their position and distance with respect to each other in an operating state of the air spring. In case one of the height measuring signal transmitter and the receiver is mounted outside of the air spring, this element may be easy accessible for maintenance purposes, for example.

According to a further embodiment of this invention, the height measuring signal transmitter is arranged inside of the interior space of the air spring. Utilizing this configuration may protect the height measuring signal transmitter from the influence of environmental effects including moisture, water, extreme temperatures, dust, dirt, oil and other organic fluids.

According to a further embodiment, the receiver is arranged inside of the interior space of the air spring. Thus, the receiver may also be protected from the influence of external environmental effects. Further, when the height measuring signal transmitter and the receiver are both arranged inside of the air spring, i.e. within the interior space, in particular a wireless signal transmission from the height measuring signal transmitter to the receiver and vice versa may be subjected to less interferences, in particular when being transmitted wirelessly.

According to a further embodiment, wherein the belly comprises a conductive layer arranged at an interior surface of the belly, wherein the height measuring signal transmitter is adapted to generate the height signal depending on the distance to the conductive layer. The conductive layer may be a solid material or a lattice-like or net-like material with a multitude of recesses. A solid material may provide an improved shielding against external electromagnetic interferences, wherein a lattice-like or net-like layer may facilitate a mechanically flexible and elastic layer with a reduced weight compared to a solid material layer. The conductive layer may be arranged distant to an inner surface of the belly or laying up on that inner surface. Alternatively, the conductive layer may be arranged within the material of the belly.

According to a further embodiment, the air spring comprises a first energy transfer element connecting the height measuring signal transmitter and the receiver and adapted for transmitting energy from one of the height measuring signal transmitter and the receiver to the other one of the height measuring signal transmitter and the receiver, wherein the first energy transfer element is arranged inside of the interior space. The energy transfer element may be a line or a wire adapted for transmitting electrical or optical energy, wherein the energy receiving element of the height measuring signal transmitter and the receiver is adapted for receiving the transmitted energy. The energy transfer element may be protected from external influences and may thus lead to reduced mechanical damages in case it is arranged inside of the interior space.

According to a further embodiment, the air spring comprises a second energy transfer element connecting the height measuring signal transmitter and the receiver and adapted for transmitting energy from one of the height measuring signal transmitter and the receiver to the other one of the height measuring signal transmitter and the receiver, wherein the second energy transfer element is arranged outside of the interior space. The second energy transfer element may be used additionally or alternatively to the first energy transfer element. In cases where it is used in addition to the first energy transfer element, the second energy transfer element may provide a redundancy system for the energy receiving element of the height measuring signal transmitter and the receiver.

According to a further embodiment, the air spring comprises a first height signal transfer element adapted for transmitting a height signal from one of the height measuring signal transmitter and the receiver to the other one of the height measuring signal transmitter and the receiver, wherein the first height signal transfer element is arranged inside of the interior space. The height signal transfer element may be a line or a wire adapted for transmitting the height signal using electrical, acoustical, or optical signals. The height signal transfer element, which may be a wireless sender and receiver, may be protected from external influences and may thus lead to reduced mechanical damages in case it is arranged inside of the interior space.

According to a further embodiment, the air spring comprises a second height signal transfer element adapted for transmitting a height signal from one of the height measuring signal transmitter and the receiver to the other one of the height measuring signal transmitter and the receiver, wherein the second height signal transfer element is arranged outside of the interior space. The second height signal transfer element may be used additionally or alternatively to the first height signal transfer element. In case it is used additionally to the first height signal transfer element, the second height signal transfer element may provide a redundancy system for the height signal transmission.

These and other aspects of the present invention will become apparent from and elucidated with reference to the embodiments described hereinafter.

BRIEF DESCRIPTION OF THE DRAWINGS

FIG. 5 illustrates an air spring.

FIG. 6 illustrates an air spring according to a further exemplary embodiment of the invention.

FIG. 7 illustrates an air spring according to a further exemplary embodiment of the invention.

Figure 1:
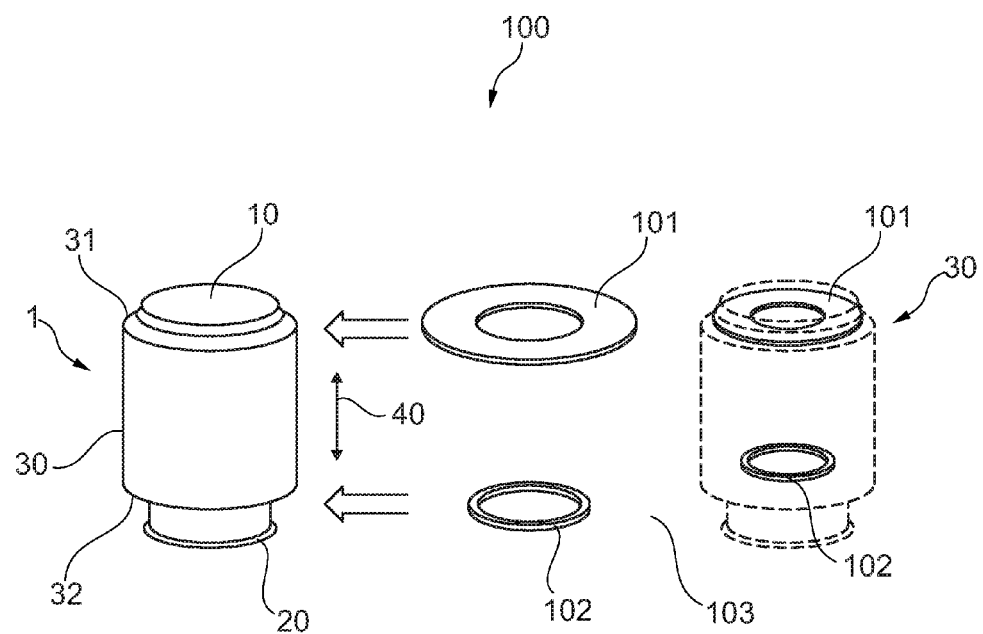
FIG. 1 illustrates an air spring according to an exemplary embodiment of the invention.

The reference numerals used in conjunction with the drawings hereof are as follows:

1 air spring
2 first vehicle portion
3 second vehicle portion
10 first mounting element
20 second mounting element
30 belly
31 first edge
32 second edge
33 interior space
40 working stroke
41 first state of the air spring
42 second state of the air spring
45 moving direction
100 air spring height sensor
101 receiver
102 height measuring signal transmitter
103 distance between height measuring signal transmitter and receiver
105 electric power supply
107 first energy transfer element
107A second energy transfer element
108 first height signal transfer element
108A second height signal transfer element
109 conductive layer
111 height signal data transmission
112 magnetic field

DETAILED DESCRIPTION OF THE INVENTION

FIG. 1 illustrates an air spring 1 with a first mounting element 10 and a second mounting element 20. The air spring further comprises a belly 30 with a first edge 31 and a second edge 32. The first edge 31 of the belly 30 is mechanically interconnected with the first mounting element 10 and the second edge 32 is mechanically interconnected with the second mounting element 20.

The belly encloses an air volume such that the working stroke 40 of the air spring represents a movement of one of the first mounting element 10 and the second mounting element 20 towards the other one of the first mounting element 10 and the second mounting element 20.

An air spring height sensor 100 with a receiver 101 in form of a coil and a height measuring signal transmitter 102 is located within the air volume of the air spring as indicated by the air spring illustrated in dotted lines. The receiver 101 is located close to the first mounting element 10 of the air spring and the height measuring signal transmitter 102 is located close to the second mounting element 20 of the air spring. Both, the receiver and the height measuring signal transmitter may be designed as coreless coils such that a working stroke 40 of the air spring is not reduced by these devices which are located within the air volume of the air spring.

FIG. 1 shows the air spring and the air spring height sensor in both the mounted and the unmounted state, wherein on the left side of the drawing the unmounted state and on the right side of the drawing the mounted state is depicted.

The air spring as described above and hereinafter may in particular be a smart air spring with an air spring height sensor as described above and hereinafter as air spring level unit or height measurement system. The air spring may in particular be an air spring with intelligent sensor and actuator functions. One of the important features is the integrated air spring height sensor. The function of the air spring height sensor is to measure with reasonable accuracy the current absolute axial position of the air spring, i.e. the distance between the first mounting element and the second mounting element (in other words, the current length of the air spring). Such a sensor solution may require its own application specific electronics which will be described in more detail below.

The air spring height sensor as described above and hereinafter may offer the following features: reduced or no sensitivity to electromagnetic interferences (EMI), insensitive or fully compensated for the potential effects caused by temperature and temperature fluctuations or variations, reasonably high signal resolution for the targeted measurement range, no shortening of the original operating or working stroke of the air spring, low electric current consumption, fast signal response with a wide signal bandwidth range, low or no emissions of electromagnetic interferences, insensitive to metallic objects of different kinds that may be placed near the air spring or placed inside the air spring, wherein in the latter limits of maximum size and maximum mass of the metallic object apply, insensitive to changes of humidity, dirt and dust to a certain extent.

The air spring height sensor as described above and hereinafter is not limited to air spring applications. Wherever a large measurement stroke of a linear-position-sensor is required, this described electronics solution may be applicable. Large measurement stroke means that the signal amplitude ratio may change in exponential ratio, for example in a range greater than 1:100. Examples are (but not limited to): height and position changes in vehicle suspension system including all types of vehicles, like trucks, passenger cars, rains, planes, motor bikes, etc., control of industrial processing equipment like tooling, milling, drilling, mixing, filling, shifting, sorting, like luggage sorting and handling at airports, parcel sorting at the mail service, etc., test equipment like flight simulator, engine test bed, furniture reliability tests, sports equipment testing, etc., large scale, indirect load measurement systems like weight-on-beam design, large scale mining equipment like oil drilling, tunneling, steering and position control systems in ships (rudder position), planes (flaps, rudder,). Other applications for this application may be measuring accurately the distance to a metallic object, like when the engine (locomotive) of a train is coupling to a rail-road wagon, or when a pushing-truck at the airport is automatic or semi-automatic coupling to the front-wheel of a plain. When implementing an air spring height sensor as described above and hereinafter into a smart air spring system, it may be important not to shorten the actual mechanical stroke of the air spring.

There may exist several different ways to integrate an air spring height sensor as described above and hereinafter into an air spring. FIG. 1 shows one of these possibilities, where the height measuring signal transmitter 102 is placed at one end of the air spring body, i.e. at the second mounting element 20 (like the bottom) and the receiver 101 is placed at to other end of the air spring body, i.e. at the first mounting element 10. Other design solutions are that the height measuring signal transmitter and the receiver are placed at one and the same side (not shown in FIG. 1), for example.

Figure 2:
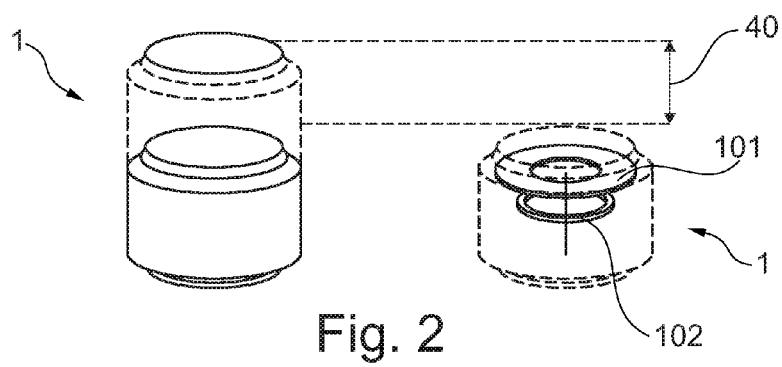
FIG. 2 illustrates an air spring according to a further exemplary embodiment of the invention.

FIG. 2 illustrates an air spring 1 in a first state or in an uncompressed state on the left side of the drawing and the air spring 1 in a second state or in a compressed state on the right side of the drawing. The difference between the length of the air spring in the first state and in the second state corresponds to the maximum working stroke of the air spring. As the height measuring signal transmitter and the receiver are designed as coils with a minimum extension in direction of the working stroke, the working stroke of the air spring is almost not reduced when arranging the air spring height sensor as described above and hereinafter within the air volume of the air spring.

A manufacturer's specification of an air spring may define the usable working stroke range 40 which is shown in connection with the first state and the second state of the air spring in FIG. 2. In particular, the user of the air spring should not alter the air spring as to inflate it any higher or deflate it any lower than described in the manufacturer's specification. Going beyond the specified "Min/Max" positions may result in damages to the rubber belly of the air spring. In any case, to avoid damaging the air spring height sensor components when the air spring may get fully deflated, the individual sensing components height measuring signal transmitter and receiver have to be spaced sufficiently so that they never crash into each other at the minimum distance or when the air spring takes the second state. In a preferred embodiment, the air spring height sensor as described above and hereinafter may be built in such way that the height measuring signal transmitter and the receiver may come very close to each other when the air spring is fully deflated or collapsed.

The second state is the state in which the sensor signal transfer is most efficient and therefor the largest height signal can be expected at the output of the passive or active working signal receiver. This signal may also be called the original or untreated height signal.

When moving from the second state to the first state, the distance between the height measuring signal transmitter and the receiver steadily increases such that the original height signal is decreasing, wherein the decreasing may occur exponentially.

Figure 3:
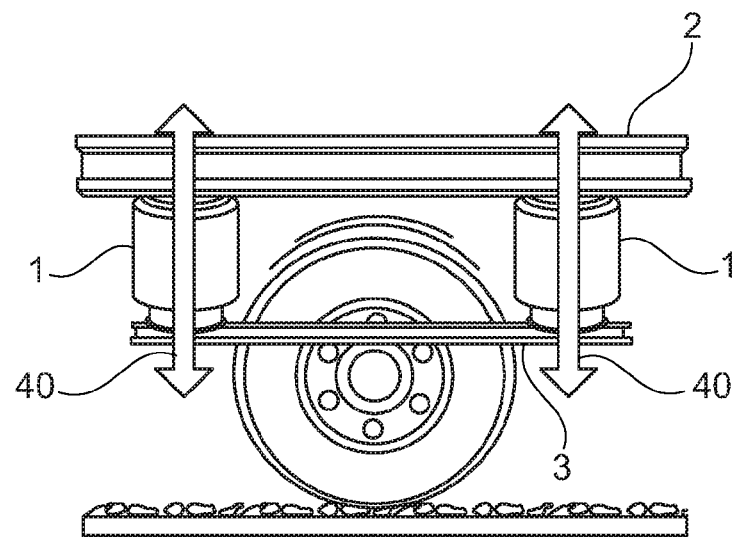
FIG. 3 illustrates a wheel suspension with an air spring according to a further exemplary embodiment of the invention.

FIG. 3 illustrates a wheel suspension of a vehicle with two air springs 1 as described above and hereinafter. The second vehicle portion 3, i.e. the movable part of the wheel suspension which is mounted to the wheel, is adapted to move along the arrows 40, which correspond to the measuring distance and the working stroke of the air springs, wherein one mounting element of the air spring is attached to the second vehicle portion. The other one of the mounting elements of the air spring is mounted to the first vehicle portion 2.

Figure 4:
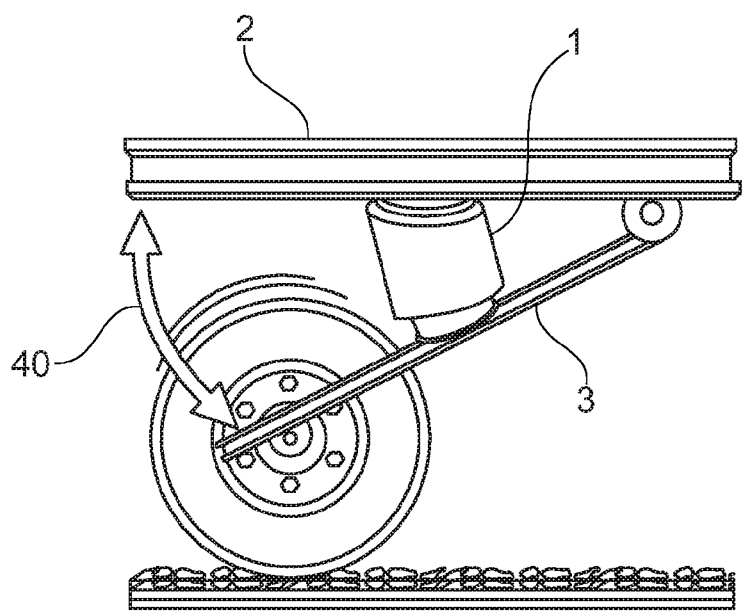
FIG. 4 illustrates a wheel suspension with an air spring according to a further exemplary embodiment of the invention.

FIG. 4 illustrates an alternative wheel suspension of a vehicle with one air spring 1, wherein one of the mounting elements of the air spring is attached to the movable second vehicle portion 3 and the other one of the mounting elements is attached to the first vehicle portion 2. The second vehicle portion is rotatably movable around a hinge which mechanically interconnects the first vehicle portion and the second vehicle portion.

FIG. 5 shows an air spring 1 in a first state 41 and in a second state 42, wherein the air spring is in the first state to its maximum length and in the second state in a compressed state and thus to a reduced length. The first mounting element 10 and the second mounting element 20 are adapted to move towards each other along the moving direction 45.

By increasing the air pressure in the air spring, the belly 30, which may be designed as a rubber tube, will expand vertically along the moving direction 45, and with this increase the distance or spacing between the first mounting element and the second mounting element. The objective here is to measure the distance between the first mounting element and the second mounting element.

FIG. 6 illustrates an air spring 1, wherein the height measuring signal transmitter 102 is arranged at the first mounting element 10 and the receiver 101 is arranged at the second mounting element 20. Both, the height measuring signal transmitter and the receiver are arranged at the first mounting element and at the second mounting element, respectively such that they are located outside of the interior space 33 of the air spring. Thus, with respect to the moving direction of the first mounting element towards the second mounting element, these both elements are arranged in between the height measuring signal transmitter and the receiver. In this embodiment, the height measuring signal transmitter and the receiver may not reduce the working stroke of the air spring, as they are not located inside of the interior space 33.

FIG. 7 illustrates an air spring 1, wherein both the height measuring signal transmitter and the receiver are arranged inside of the interior space 33 of the air spring, wherein the height measuring signal transmitter 102 is mounted to the first mounting element 10 and the receiver 101 is mounted to the second mounting element 20, both on an interior surface of the mounting elements 10, 20, respectively.

It should be noted that any one of the height measuring signal transmitter and the receiver may be mounted at one of the first mounting element and second mounting element inside of the interior space or outside of the interior space. Thus, four possible configurations of the air spring and the elements of the air spring height sensor may be provided: height measuring signal transmitter outside, receiver inside; height measuring signal transmitter outside, receiver, outside; height measuring signal transmitter inside, receiver inside; height measuring signal transmitter inside, receiver outside.

There are several design options available about how to apply a magnetic principle based air spring height sensor into or onto an air spring. For example, some or all of the active and passive sensing components like height measuring signal transmitter and receiver are placed inside the pressured chamber of the air spring, i.e. within the interior space. Other design options are that the measurement target of the height sensor, i.e. the receiver, is either a metallic plate or another type of metallic object that is placed inside the interior space, or the metallic mounting plate 20 or the chassis of a vehicle will be used as the sensing target.

There are four possible design options available for the air spring height sensor, of which two are shown in FIGS. 6 and 7: active height measuring signal transmitter outside of the air spring pressure chamber and reference device also outside of the air spring pressure chamber (shown in FIG. 6); height measuring signal transmitter and receiver inside of the air spring pressure chamber (shown in FIG. 7); height measuring signal transmitter outside and receiver inside; height measuring signal transmitter inside and receiver outside of the air spring pressure chamber.

As the air spring height sensor is measuring the distance 103 between the height measuring signal transmitter and the receiver, a calibration may be required in order to consider the varying distance 103 dependent on the mounting location of the height measuring signal transmitter and the receiver. For example, the distance 103 is different in FIGS. 6 and 7, but the distance between the first mounting element and the second mounting element which may be the maximum working stroke of the air spring, is the same. Thus, the offset of the distance 103 resulting from the mounting location of the air spring height sensor components must be taken in account when calculating the current air spring height.

Figure 8:
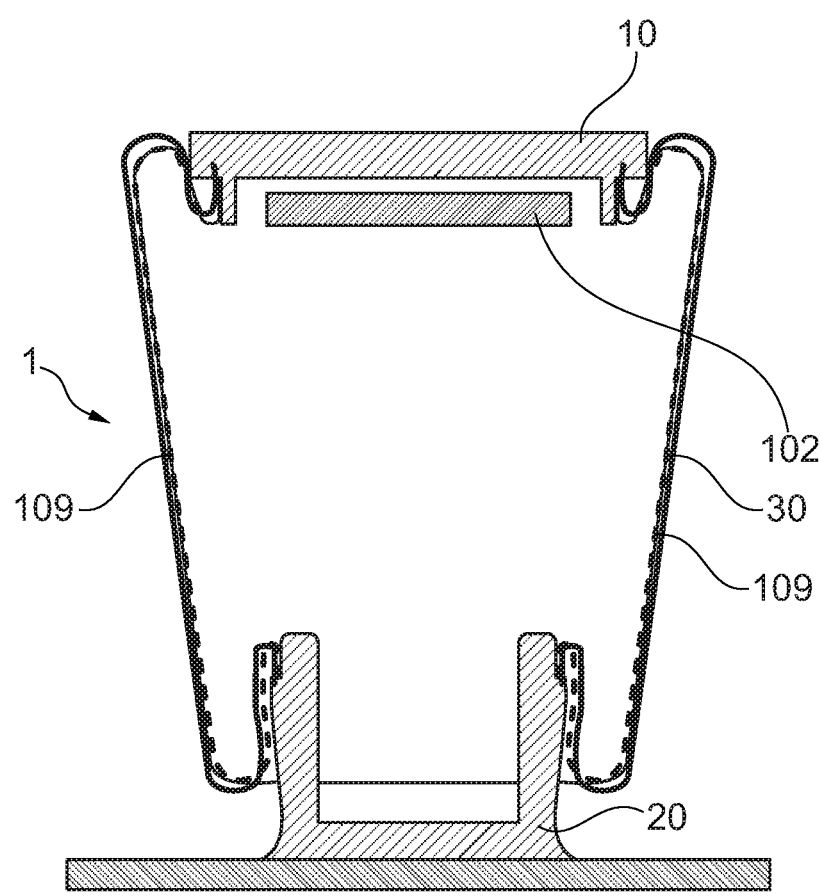
FIG. 8 illustrates an air spring according to a further exemplary embodiment of the invention.

FIG. 8 illustrates an air spring 1, wherein the height measuring signal transmitter 102 is mounted inside of the interior space to the first mounting element 10. The air spring 1 comprises a conductive layer 109 which is arranged at an interior surface of the belly 30. The conductive layer may cover the complete inner surface of the belly and may be used as a passive receiver element in order to determine the air spring height with a height measuring signal emitted by the height measuring signal transmitter. In case the first mounting element 10 moves towards the second mounting element 20, the distance from the height measuring signal transmitter to the interior layer may be reduced as the belly and the air spring has a conical or tapered cross section rejuvenating from the first mounting element to the second mounting element. The function principle would work similar in case the height measuring signal transmitter is arranged at the second mounting element instead being arranged at the first mounting element, which would lead to an inversion of the rejuvenating direction. Thus, the distance from the height measuring signal transmitter to the conductive layer may serve as a reference value for the air spring height.

Alternatively, when compressing the first mounting element and the second mounting element towards each other, the amount and quantity of the conductive layer may vary and may in particular be reduced as the belly curves and bends sideward of the height measuring signal transmitter and the second mounting element 20 which may lead to a varying height measuring signal. Measuring the air spring height this way may require a calibration process wherein the detected height signal is allocated or assigned to the current air spring height. When using a conductive coating or metal fibers in the air chamber mantling or belly 30 which may be a rubber similar material, then this may be sufficient as a reference device for the height signal transmitted by the height measuring signal transmitter.

Figure 9:
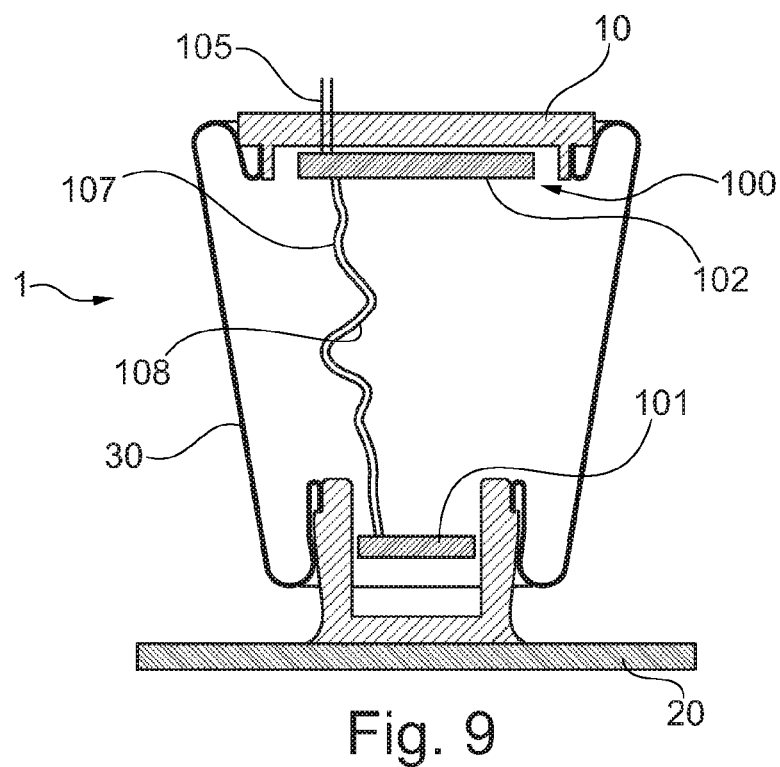
FIG. 9 illustrates an air spring according to a further exemplary embodiment of the invention.

FIG. 9 illustrates an air spring 1, wherein the height measuring signal transmitter 102 is located inside of the interior space and is connected to an electric power supply 105 through a recess or a bore in the first mounting element. The height measuring signal transmitter 102 is connected to the receiver 101 which is mounted to the second mounting element and is located inside of the interior space via the first energy transfer element 107 for transmitting electrical energy to the receiver. Thus, the receiver does not require an individual power supply from the external surroundings of the air spring which may reduce the openings or recesses of the air spring housing.

Further, the height measuring signal transmitter and the receiver are interconnected with the first height signal transfer element 108. The receiver may transmit a detected height signal via the first height signal transfer element 108 back to the height measuring signal transmitter and/or to an evaluating unit (not shown) which determines the current air spring height. The first energy transfer element and the first height signal transfer element may be a wire. Alternatively, both the energy and the height signal may be transmitted using a single transmission channel, i.e. use the same wire.

Figure 10:
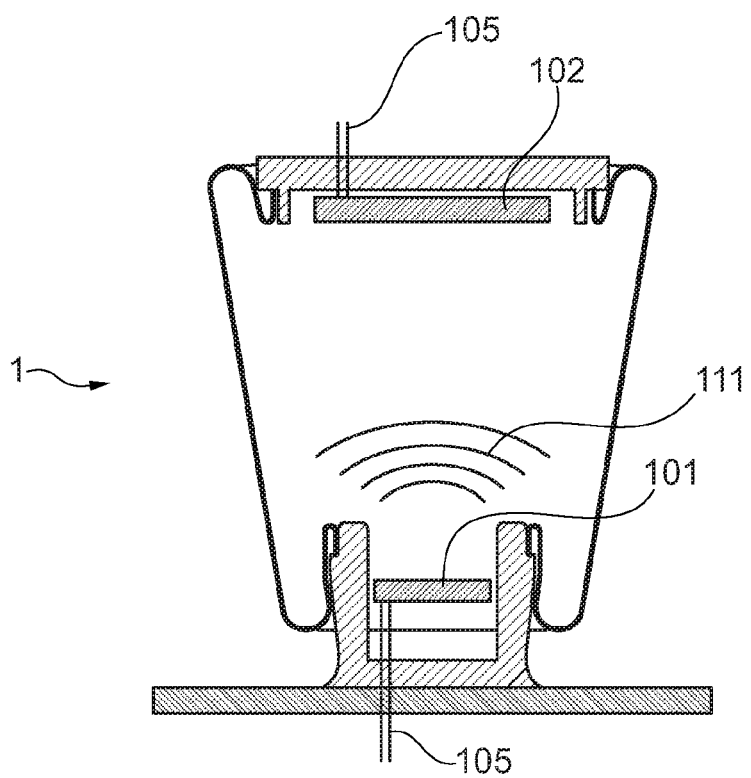
FIG. 10 illustrates an air spring according to a further exemplary embodiment of the invention.

FIG. 10 illustrates an air spring 1 with an air spring height sensor comprising a height measuring signal transmitter 102 mounted to the first mounting element and a receiver 101 mounted to the second mounting element. Both, the height measuring signal transmitter and the receiver have their individual power supply 105.

The height signal may be transmitted wireless from the receiver to the height measuring signal transmitter, or the height measuring signal transmitter is adapted to detect a magnetic field generated by the receiver and determine the distance between the height measuring signal transmitter and the receiver depending on the field strength of the magnetic field lines. The height measuring signal transmitter and the receiver are adapted for wireless data and height signal transmission in single direction or dual direction, i.e. from one of the height measuring signal transmitter and the receiver to the other one of the height measuring signal transmitter and the receiver only or from the height measuring signal transmitter to the receiver and vice versa.

The individual power supply of the height measuring signal transmitter and the receiver may be used additionally to the energy transmission via the first energy transfer element 107 shown in FIG. 9 such that a redundant energy supply system for the height measuring signal transmitter and the receiver is provided. The first energy transfer element 107 may thus provide one the receiver or the height measuring signal transmitter with electrical energy from the other one of the height measuring signal transmitter and the receiver in case the individual power supply of one of these elements fails.

Figure 11:
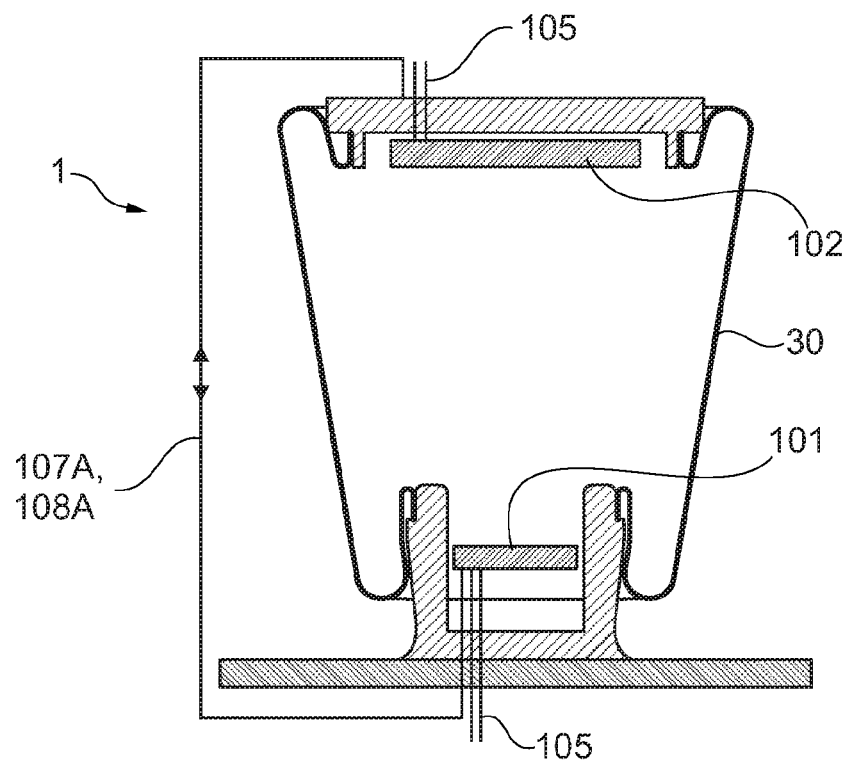
FIG. 11 illustrates an air spring according to a further exemplary embodiment of the invention.

FIG. 11 illustrates an air spring 1, wherein the height measuring signal transmitter 102 and the receiver 101 are individually powered via the energy supply 105 and further connected via the second energy transfer element 107A with each other to provide a redundant energy supply to the height measuring signal transmitter and the receiver, wherein the second energy transfer element 107A is located outside of the air spring and the interior space.

Further, the height measuring signal transmitter and the receiver are connected to each other with the second height signal transfer element 108A, which enables a height signal transmission between the height measuring signal transmitter and the receiver, wherein the second height signal transfer element 108A is located outside of the air spring.

Figure 12:
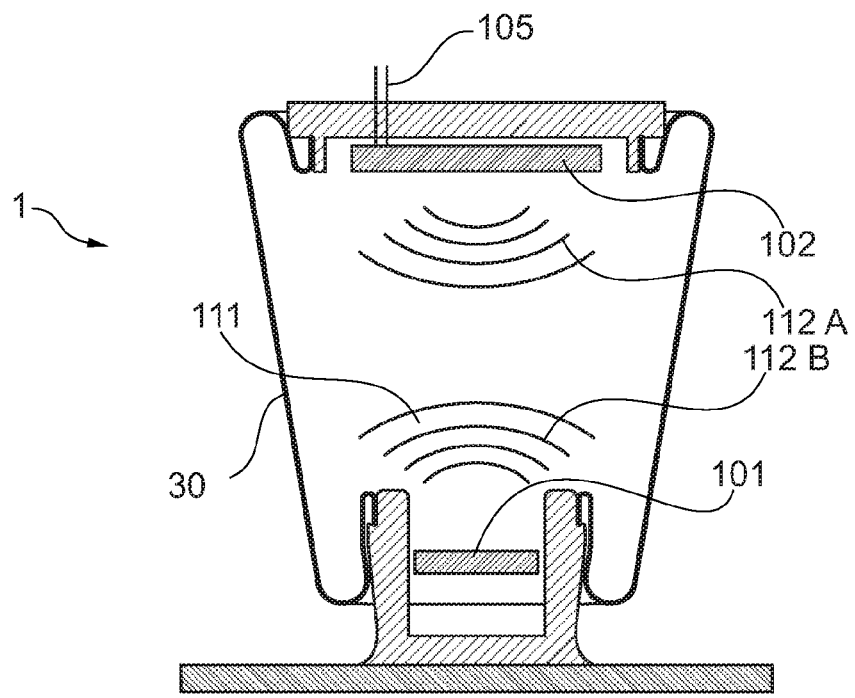
FIG. 12 illustrates an air spring according to a further exemplary embodiment of the invention.

FIG. 12 illustrates an air spring 1, wherein the height measuring signal transmitter 102 is connected to the power supply 105 and wherein the receiver is configured as an autonomous system which receives energy wireless and also transmits the measured height signal wireless. In other words, the receiver neither requires a wired power supply nor a wired height signal transmission channel. The energy may either be receiving magnetically or harvested otherwise.

This application claims benefit of European Patent Application Serial No. EP 12194294, filed on Nov. 26, 2012. It should be understood that the features described in individual exemplary embodiments may also be combined with each other in order to obtain a more fail safe air spring height sensor or air spring as well as to enable error detection and correction of the measured height signal. While certain representative embodiments and details have been shown for the purpose of illustrating the subject invention, it will be apparent to those skilled in this art that various changes and modifications can be made therein without departing from the scope of the subject invention.

What is claimed is:

1. An air spring comprising:
   a first mounting element being adapted for being mounted to a first vehicle portion,
   a second mounting element being adapted for being mounted to a second vehicle portion being springy movable with respect to the first vehicle portion,
   an air volume limited by a resilient belly having an interior space, a first edge, and a second edge, which belly with the first edge is sealed to the first mounting element and with the second edge is sealed to the second mounting edge, and
   an air spring height sensor comprising
   a height measuring signal transmitter, and
   a receiver,
   wherein the height measuring signal transmitter is adapted for transmitting a height signal,
   wherein the receiver is adapted for sensing the height signal transmitted by the height measuring signal transmitter, and
   wherein the height signal indicates a distance between the height measuring signal transmitter and the receiver,
   wherein the air spring height sensor is adapted for measuring a working stroke of the air spring, which working stroke corresponds to a distance between the first mounting element and the second mounting element.

2. The air spring according to claim 1,
   wherein at least one of the height measuring signal transmitter and the receiver is adapted for being connected to an electric power supply.

3. The air spring according to claim 2,
   further comprising a first height signal transfer element which is adapted for transmitting the height signal from one of the height measuring signal transmitter and the receiver to the other one of the height measuring signal transmitter and the receiver.

4. The air spring according to claim 2,
   wherein the height signal is transmitted wirelessly from one of the height measuring signal transmitter and the receiver to the other one of the height measuring signal transmitter and the receiver.

5. The air spring according to claim 1,
   wherein at least one of the height measuring signal transmitter or the receiver is adapted for being connected to an electric power supply with a wire.

6. The air spring according to claim 1,
   wherein one energy transmitting element of the height measuring signal transmitter and the receiver is adapted for wirelessly transmitting energy to the other one energy receiving element of the height measuring signal transmitter and the receiver,
   wherein the energy transmitting element is adapted to generate a magnetic field, and
   wherein the magnetic field is adapted to induce an electric current in the energy receiving element.

7. The air spring according to claim 1,
   further comprising a first energy transfer element connecting the height measuring signal transmitter and the receiver,
   wherein the first energy transfer element is adapted for transmitting energy from one of the height measuring signal transmitter and the receiver to the other one of the height measuring signal transmitter and the receiver.

8. The air spring according to claim 1,
   further comprising a first height signal transfer element which is adapted for transmitting the height signal from one of the height measuring signal transmitter and the receiver to the other one of the height measuring signal transmitter and the receiver.

9. The air spring according to claim 1,
   wherein the height signal is transmitted wirelessly from one of the height measuring signal transmitter and the receiver to the other one of the height measuring signal transmitter and the receiver.

10. The air spring according to claim 1,
    wherein the belly comprises a conductive layer arranged at an interior surface of the belly, and
    wherein the height measuring signal transmitter is adapted to generate the height signal depending on the distance to the conductive layer.

11. The air spring according to claim 10,
    wherein the height measuring signal transmitter is arranged inside of the interior space of the air spring.

12. The air spring according to claim 1,
    wherein the height measuring signal transmitter is arranged inside of the interior space of the air spring.

13. The air spring according to claim 1,
    wherein the receiver is arranged inside of the interior space of the air spring.

14. The air spring according to claim 1,
    wherein the height measuring signal transmitter is mounted to the first mounting element, and
    wherein the receiver is mounted to the second mounting element as to sense a height signal with respect to the first mounting element.

15. The air spring according to claim 1,
    further comprising a first energy transfer element connecting the height measuring signal transmitter and the receiver and adapted for transmitting energy from one of the height measuring signal transmitter and the receiver to the other one of the height measuring signal transmitter and the receiver,
    wherein the first energy transfer element is arranged inside of the interior space.

16. The air spring according to claim 1,
further comprising a second energy transfer element connecting the height measuring signal transmitter and the receiver and adapted for transmitting energy from one of the height measuring signal transmitter and the receiver to the other one of the height measuring signal transmitter and the receiver,
wherein the second energy transfer element is arranged outside of the interior space.

17. The air spring according to claim 1,
comprising a first height signal transfer element adapted for transmitting a height signal from one of the height measuring signal transmitter and the receiver to the other one of the height measuring signal transmitter and the receiver,
wherein the first height signal transfer element is arranged inside of the interior space.

18. The air spring according to claim 17,
further comprising a second height signal transfer element adapted for transmitting a height signal from one of the height measuring signal transmitter and the receiver to the other one of the height measuring signal transmitter and the receiver,
wherein the second height signal transfer element is arranged outside of the interior space.

19. The air spring according to claim 1,
further comprising a second height signal transfer element adapted for transmitting a height signal from one of the height measuring signal transmitter and the receiver to the other one of the height measuring signal transmitter and the receiver,
wherein the second height signal transfer element is arranged outside of the interior space.

* * * * *